Alfred J. Munn,
INVENTOR

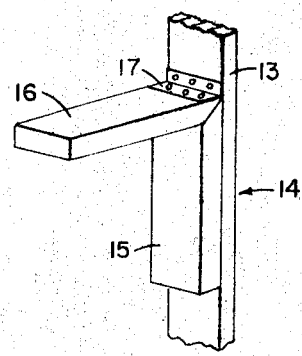
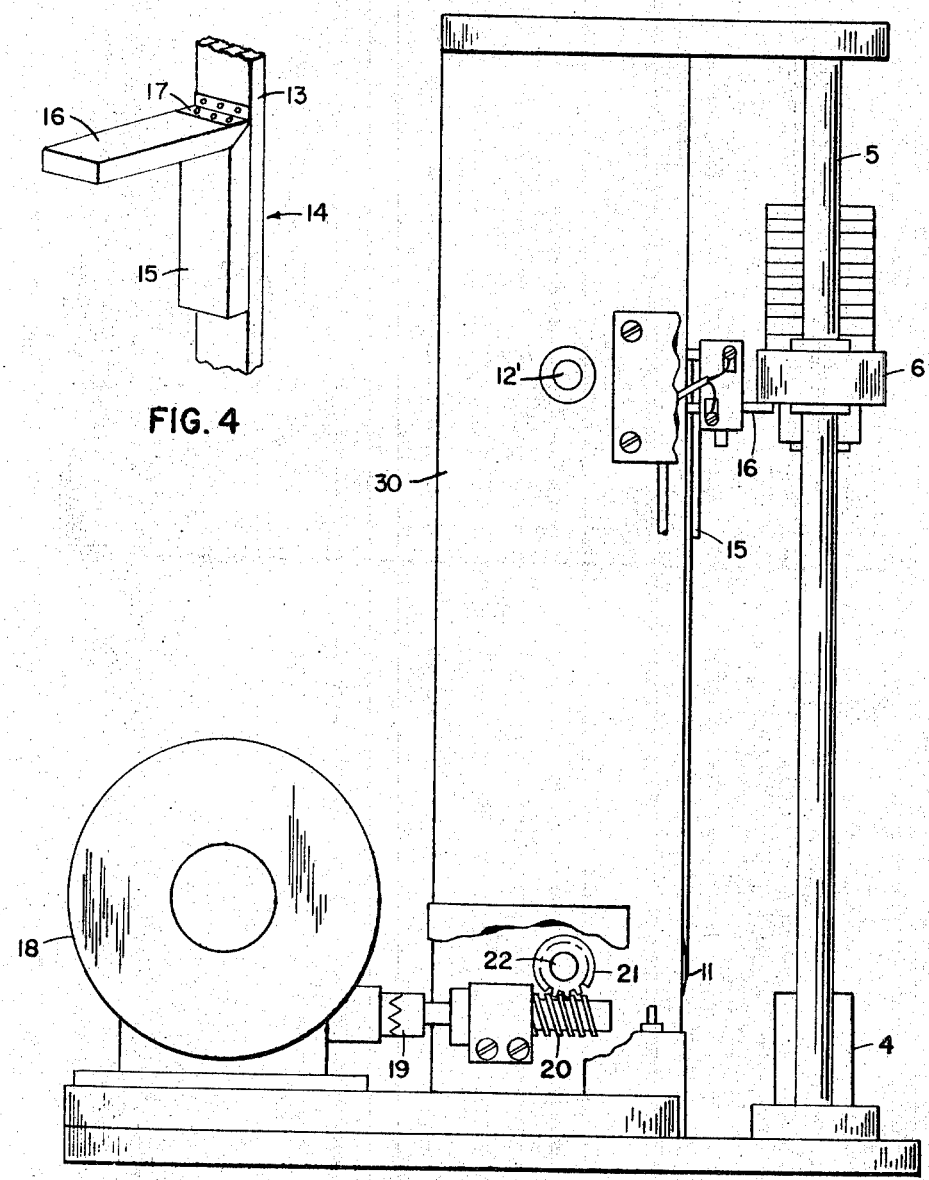
FIG. 4
FIG. 5

United States Patent Office 3,545,251
Patented Dec. 8, 1970

3,545,251
CONTROLLED AXIAL IMPACT TESTING APPARATUS
Alfred J. Munn, Lyndhurst, N.J., assignor, by mesne assignments, to the United States of America as represented by the Secretary of the Army
Filed Dec. 24, 1968, Ser. No. 786,712
Int. Cl. G01n *3/08*
U.S. Cl. 73—12
3 Claims

ABSTRACT OF THE DISCLOSURE

An impact apparatus for axially testing an integrated circuit package terminal under simulated shock conditions. The apparatus includes a weighted carriage provided with a ram for impacting the terminal. The carriage is lowered under control of an arm secured to a belt driven by a motor. The motor speed is governed by a control device to insure that the rate of descent of the ram is at the required velocity. After the ram has impacted the terminal, the arm actuates a stop switch that discontinues operation of the motor.

BACKGROUND OF THE INVENTION

This invention relates to the field of shock testing apparatus. The terminals of an integrated circuit package may be subjected to shock conditions during the operation of automatically wire wrapping a terminal. This shock condition occurs when a spindle of the automatic wire wrap machine is operating out of alignment with the terminal being wired. Testing the terminals under simulated shock conditions is extremely difficult because of a very low impact velocity requirement.

SUMMARY OF THE INVENTION

The present invention has provided a solution to this problem by controlling the velocity of the impact mass from near zero to approximately 4½ inches per second. The impact mass is lowered by a belt with the velocity of the belt controlled by a motor and speed control device.

It is, therefore, an object of the present invention to provide an impact testing apparatus that will simulate shock conditions on integrated circuit package terminals with a very low impact velocity requirement.

This invention may be better understood from the following detailed description taken in conjunction with the accompanying drawings.

BRIEF DESCRIPTION OF THE DRAWINGS

FIG. 4 shows the hinged arm connected to the belt.
FIG. 5 is a perspective view showing the drive connections for the apparatus.

DESCRIPTION OF THE PREFERRED EMBODIMENT

Figure 1:
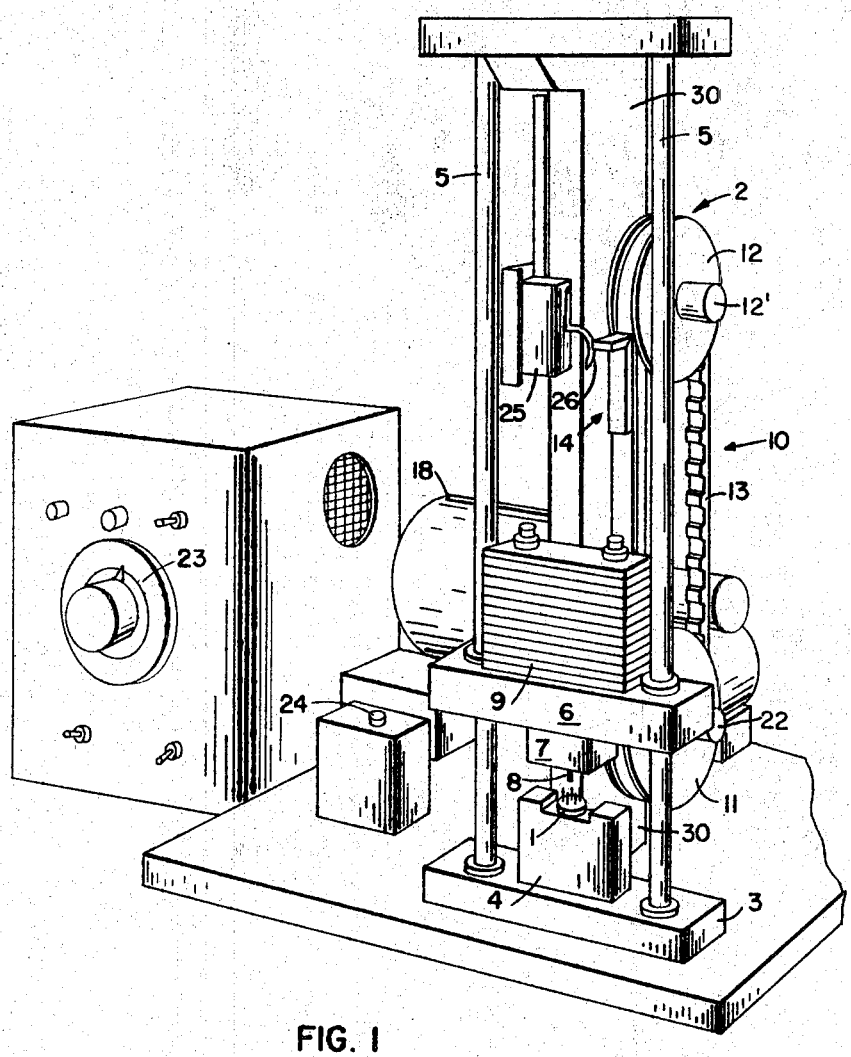
FIG. 1 shows a perspective view of the impact testing apparatus.

In FIG. 1, reference numeral 1 identifies the integrated circuit package being tested. Reference numeral 2 generally indicates the testing apparatus. Base 3 is located near the lower part of the apparatus and has anvil 4 as well as guide rods 5 secured to it. The anvil supports the integrated package circuit package so that the projecting pin terminals of the package project upwardly from the anvil. Rods 5 provide a sliding guide means for weighted carriage 6 that has block 7 secured to it and the block in turn is provided with a downwardly projecting ram 8 to engage the pin terminal being tested, shown in FIG. 2. Discrete weights 9 can be added or subtracted from the carriage 6 to vary the impact mass.

Figure 3:
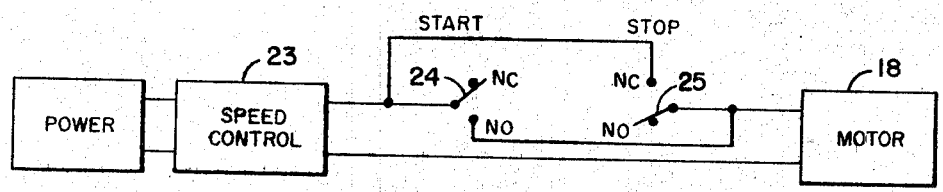
FIG. 3 is a schematic of the electrical elements of the invention.

Reference numeral 10 generally indicates a pulley mechanism which includes a driving gear 11, an idler pulley 12, a toothed belt 13 disposed parallel to the guide rods and arm support means 14. The gear and pulley are toothed to match the teeth of belt 13 to prevent slippage. The arm support means has a member 15 secured to the belt and a member 16 hinged to member 15 by hinge 17, shown in FIG. 4, thus allowing member 16 to pivot from a horizontal position towards a vertical position. The carriage is manually lifted and slides on guide rods 5 until it pivots member 16 towards a vertical position thus allowing passage of the carriage. Member 16 flips back into its horizontal position after passage of the carriage which is then lowered for support on the arm in the manner shown in FIG. 5. Power for driving gear 11 and the belt is supplied from motor 18, mechanical connection 19, worm drive 20 and gear 21 which is connected to gear 11 by shaft 22. Shaft 22 and shaft 12' which supports gear 12 are journalled in a support frame 30. Speed control device 23 governs the speed of the motor. Switch 24 is manually actuated to start operation of the testing apparatus, while stop switch 25 and actuator 26 are operated by the bracket support means after the terminal has been impacted. The speed control device is powered by a power source shown in FIG. 3.

Figure 2:
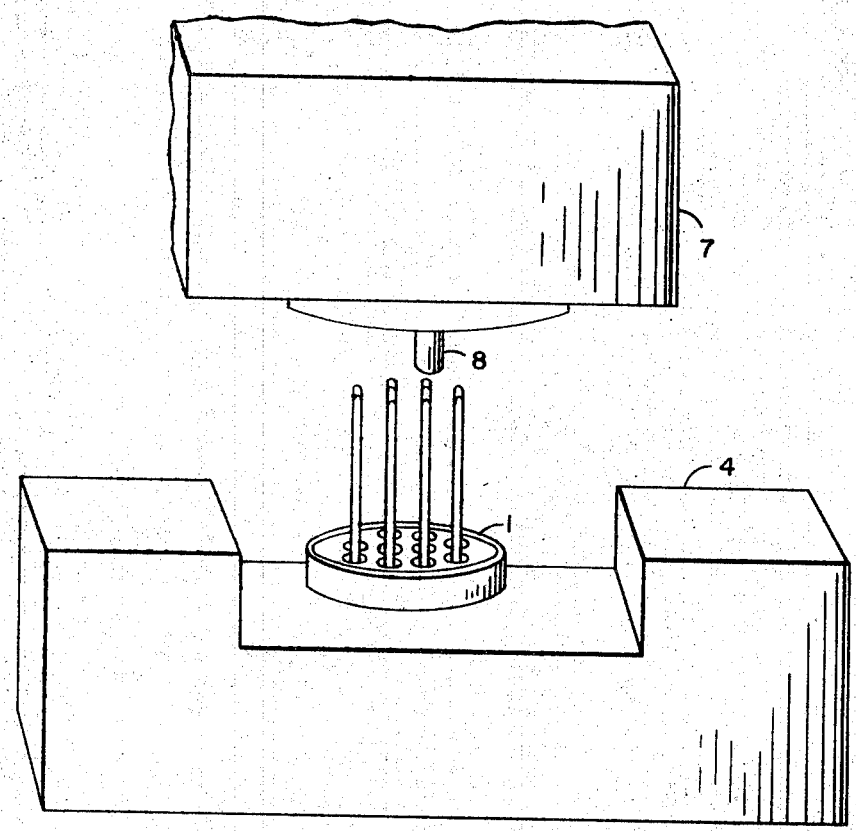
FIG. 2 is a perspective view showing the projecting ram.

The operation of the controlled axial impact testing apparatus is as follows: The integrated circuit package to be tested is placed on the anvil and positioned so that a terminal to be tested will be aligned with ram 8, as shown in FIG. 2. The carriage is then manually lifted upward until it passes hinged member 16 which will then flip back to its horizontal supporting position and the carriage is then lowered onto the arm. The motor speed control device is adjusted so that the carriage rate of descent will be at the desired velocity, which velocity, may be varied from near zero to approximately 4½ inches per second. Starting switch 24 is depressed and held until the member 16 clears switch actuator 26 and the motor drives the gears for lowering the weighted carriage at the velocity at which the speed control is set. When ram 8 has impacted the package terminal, the weighted carriage remains in its impact position while the belt and arm continue motion until the arm engages actuator 26 of the stop switch thus cutting the power to motor 18. At this time, the process may be repeated after aligning a new terminal with ram 8.

I claim:
1. A controlled impact apparatus for testing integrated circuit packages having projecting pin terminals compris- ing: a base; an anvil for supporting the integrated circuit package and guide rods secured to said base; a carriage slidably disposed on said rods; a block secured to said carriage above said anvil and provided with a downwardly projecting ram to engage the projecting pins; a pulley mechanism having a toothed belt disposed parallel to said guide rods and an arm secured to said belt for supporting said carriage; a motor geared to said belt to provide a predetermined impact of said ram with said pins to test the resistance thereof to shock.

2. An apparatus as defined in claim 1 including a motor speed control device connected to said motor to control the velocity of the carriage.

3. An apparatus as defined in claim 1 wherein said arm is hinged to said belt.

References Cited
UNITED STATES PATENTS

| | | | |
|---|---|---|---|
| 1,293,189 | 2/1919 | Piper | 73—101 |
| 2,799,824 | 7/1957 | Heynick et al. | 73—12X |
| 2,803,131 | 8/1957 | Schnadt | 73—12X |
| 3,292,430 | 12/1966 | Collier et al. | 73—141 |

CHARLES A. RUEHL, Primary Examiner